(12) United States Patent
Kockan et al.

(10) Patent No.: US 10,862,896 B2
(45) Date of Patent: Dec. 8, 2020

(54) SYSTEM AND METHOD FOR SURROGATE LOCATIONAL DETERMINATION

(71) Applicant: DELL PRODUCTS, LP, Round Rock, TX (US)

(72) Inventors: Sinem Kockan, Austin, TX (US); Charles D. Robison, Jr., Buford, GA (US); Daniel L. Hamlin, Round Rock, TX (US)

(73) Assignee: Dell Products, L.P., Round Rock, TX (US)

( * ) Notice: Subject to any disclaimer, the term of this patent is extended or adjusted under 35 U.S.C. 154(b) by 237 days.

(21) Appl. No.: 15/134,943

(22) Filed: Apr. 21, 2016

(65) Prior Publication Data

US 2017/0310682 A1   Oct. 26, 2017

(51) Int. Cl.
| | |
|---|---|
| *H04L 29/06* | (2006.01) |
| *G06F 15/16* | (2006.01) |
| *G06F 7/04* | (2006.01) |
| *H04W 12/06* | (2009.01) |
| *H04W 4/021* | (2018.01) |
| *H04W 12/04* | (2009.01) |
| *G06F 16/9537* | (2019.01) |
| *H04W 4/80* | (2018.01) |
| *H04W 12/00* | (2009.01) |
| *H04W 84/12* | (2009.01) |

(52) U.S. Cl.
CPC ........ *H04L 63/107* (2013.01); *G06F 16/9537* (2019.01); *H04W 4/021* (2013.01); *H04W 4/80* (2018.02); *H04W 12/003* (2019.01); *H04W 12/04* (2013.01); *H04W 12/06* (2013.01); *H04L 63/0428* (2013.01); *H04W 12/00503* (2019.01); *H04W 84/12* (2013.01)

(58) Field of Classification Search
CPC ..... H04L 63/107; G06F 3/0619; H04W 4/008
USPC .......................................................... 726/9
See application file for complete search history.

(56) References Cited

U.S. PATENT DOCUMENTS

| | | | |
|---|---|---|---|
| 8,384,684 B2 | 2/2013 | Westerman | |
| 8,386,677 B2 * | 2/2013 | Lydon ..................... | H04W 8/24 455/422.1 |
| 9,618,358 B2 * | 4/2017 | Meisels .............. | G01C 21/3682 |
| 9,680,942 B2 * | 6/2017 | Dimmick ................ | H04L 67/18 |
| 2004/0253969 A1 * | 12/2004 | Nguyen ................ | H04W 76/11 455/515 |
| 2006/0085357 A1 * | 4/2006 | Pizarro .................. | G06Q 20/10 705/64 |

(Continued)

OTHER PUBLICATIONS

Pravin Pawar1; Towards Location Based QoS-Aware Network Selection Mechanism for the Nomadic Mobile Services; IEEE: 2009; p. 1-5.*

*Primary Examiner* — Monjur Rahim
(74) *Attorney, Agent, or Firm* — Larson Newman, LLP

(57) ABSTRACT

Surrogate locational determination may rely on a surrogate device to provide a locational fix. When a device lacks an accurate geo-location system, communication may be established with a nearby surrogate device. The surrogate device is queried for an accurate location, such as that determined by a global positioning system receiver. Because the surrogate device is geographically proximate, the location determined by the global positioning system receiver may serve as a proxy or substitute for the local fix of the device.

20 Claims, 14 Drawing Sheets

(56) References Cited

U.S. PATENT DOCUMENTS

| | | | |
|---|---|---|---|
| 2007/0230468 A1* | 10/2007 | Narayanan | H04L 29/12103 370/392 |
| 2008/0077615 A1* | 3/2008 | Burger | G06Q 10/08 |
| 2008/0108261 A1* | 5/2008 | Swan | B63C 9/0005 441/89 |
| 2008/0249983 A1* | 10/2008 | Meisels | G06F 17/30241 |
| 2009/0006589 A1* | 1/2009 | Forbes | H04L 67/16 709/223 |
| 2009/0204354 A1* | 8/2009 | Davis | H04W 4/029 702/89 |
| 2012/0058782 A1* | 3/2012 | Li | G01S 19/14 455/456.2 |
| 2013/0018826 A1* | 1/2013 | Sundararajan | H04L 12/6418 706/12 |
| 2013/0340033 A1* | 12/2013 | Jones | H04W 12/08 726/1 |
| 2015/0195266 A1* | 7/2015 | Endo | G06F 21/44 726/7 |
| 2015/0319161 A1* | 11/2015 | Dimmick | H04L 63/0823 726/4 |
| 2016/0036857 A1* | 2/2016 | Foxhoven | H04L 63/20 726/1 |
| 2016/0204951 A1* | 7/2016 | Walton et al. | |
| 2017/0180953 A1* | 6/2017 | Hovey | H04W 4/08 |
| 2017/0192988 A1* | 7/2017 | Giertler | G06F 17/30094 |
| 2017/0196499 A1* | 7/2017 | Hunter | A61B 5/412 |

* cited by examiner

SYSTEM AND METHOD FOR SURROGATE LOCATIONAL DETERMINATION

FIELD OF THE DISCLOSURE

The present disclosure generally relates to information handling systems, and more particularly relates to locational determination.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Surrogate locational determination may rely on a surrogate device to provide a locational fix. When a device lacks an accurate geo-location system, communication may be established with a nearby surrogate device. The surrogate device is queried for an accurate location, such as that determined by a global positioning system receiver. Because the surrogate device is geographically proximate, the location determined by the global positioning system receiver may serve as a proxy or substitute for the local fix of the device.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
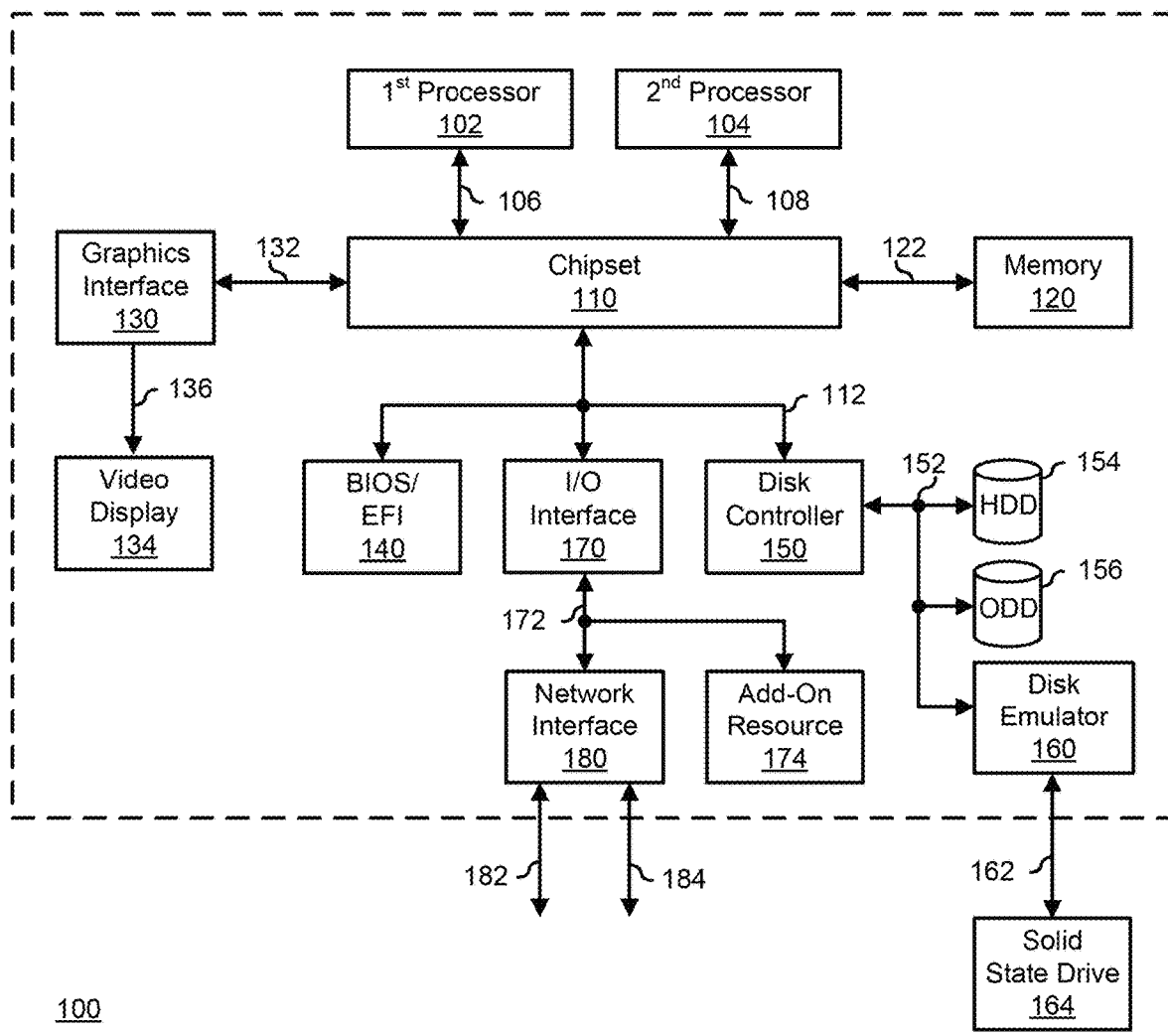
FIG. 1 is a block diagram illustrating an information handling system according to an embodiment of the present disclosure.

FIG. 1 illustrates a generalized embodiment of information handling system 100, according to exemplary embodiments. For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described above, and operates to perform one or more of the methods described above. Information handling system 100 includes a processors 102 and 104, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disc controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
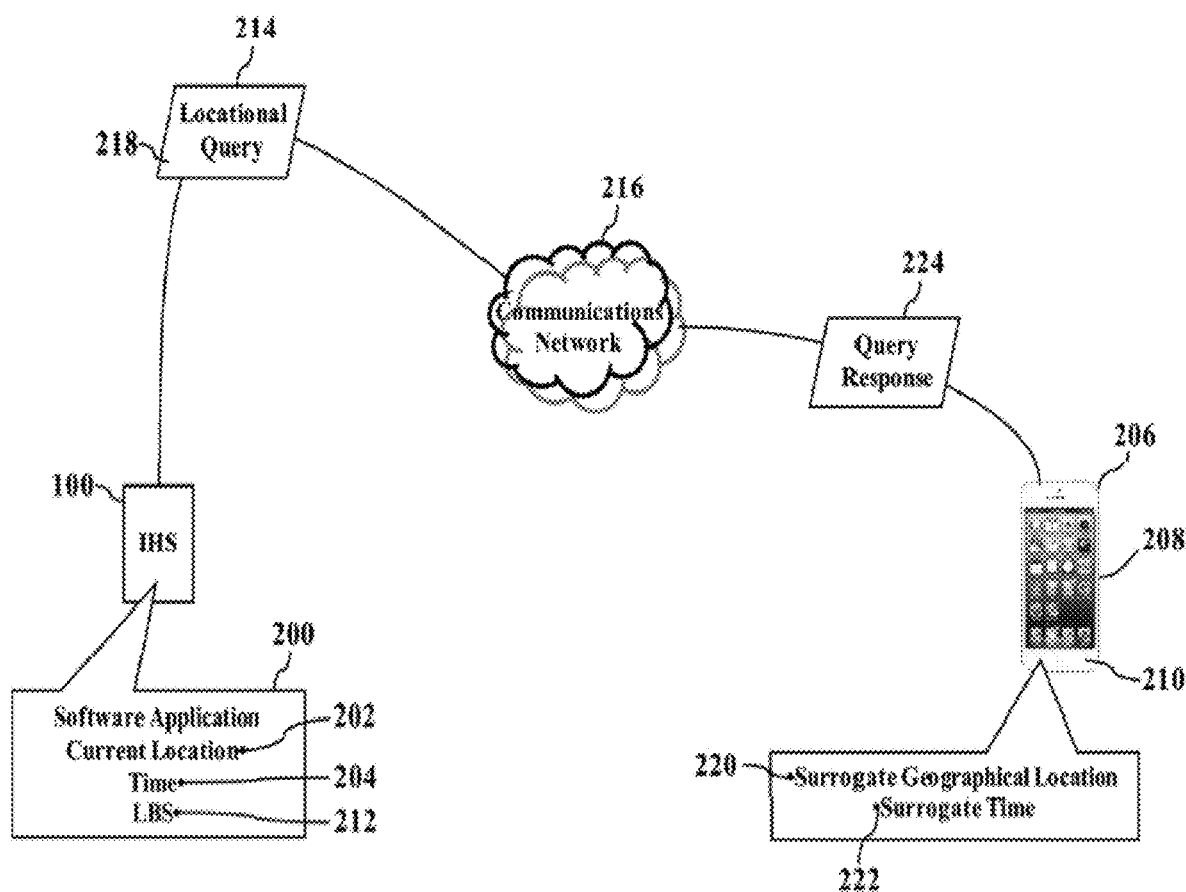
FIG. 2 is a simplified illustration of surrogate locational determination, according to exemplary embodiments.

FIG. 2 is a simplified illustration of surrogate locational determination, according to exemplary embodiments. Here the information handling system (or "IHS") 100 initializes and/or executes a software application 200 (perhaps stored in the memory 120 illustrated in FIG. 1) that desires or requires a current location 202 and/or a time 204. As the reader may realize, many software applications would like to obtain the current location 202 to provide some service or feature. Web browsers and mapping applications, for example, may use the current location 202 and the time 204 to find nearby restaurants, shops, and other topics of interest. Targeted advertising may also rely on the current location 202 and the time 204. Moreover, some software applications may use the current location 202 and/or the time 204 as security components. That is, a historically recognized or habitual current location 202 may be a component of a secure authentication scheme (such as "what you have," "what you know," "who you are," and "where you are). For whatever reason, then, the information handling system 100 may have a need for the current location 202 and the time 204.

Here, though, a surrogate device 206 may be queried. When the information handling system 100 requires the current location 202, the information handling system 100 may obtain a location from the nearby surrogate device 206. As the reader may understand, not all devices have an accurate or reliable geo-location system. The reader is likely familiar with the Global Positioning System (or "GPS") that provides very accurate locational information. However, many devices lack a GPS receiver for determining GPS information. For example, some tablet notepads (such as the APPLE® IPAD®) and health and fitness monitors (such as a FITBIT® tracker) lack GPS capability. Moreover, GPS signals are sometimes poorly received in indoor environments. So, for many reasons, the information handling system 100 may lack an ability or functionality to accurately determine the current location 202 and/or the current time 204.

Exemplary embodiments may thus rely on the surrogate device 206. FIG. 2 illustrates the surrogate device 206 as a smartphone 208, which most readers are thought familiar. The surrogate device 206, though, may be any processor-controlled device having an internal GPS receiver 210. When the information handling system 100 executes the software application 200, the software application 200 may require the current location 202 and/or the time 204 to provide any location-based service (LB S) 212. However, when the information handling system 100 determines that a local or internal geo-location capability is lacking or inaccurate, the information handling system 100 may send a locational query 214 via a communications network 216 to an Internet Protocol address associated with the smartphone 208. The locational query 214 may include security credentials 218, which later paragraphs will explain. When the smartphone 208 receives the locational query 214, the smartphone 208 retrieves a surrogate geographical location 220 and a surrogate time 222, as determined by its internal GPS receiver 210. The smartphone 208 sends a query response 224 via the communications network 216 to an Internet Protocol address associated with the information handling system 100. The query response 224 includes or specifies the surrogate geographical location 220 and/or the surrogate time 222, as determined by the GPS receiver 210. When the information handling system 100 receives the query response 224, the information handling system 100 may use the surrogate geographical location 220 and/or the surrogate time 222 as proxies for any location-based service or need. The smartphone 208, in other words, acts as a surrogate or proxy, such that its surrogate geographical location 220 substitutes for the current location 202 of the information handling system 100.

Exemplary embodiments thus include surrogate locational determinations. Whenever any device (such as the information handling system 100) lacks an accurate geo-location system, exemplary embodiments still provide location-based services. For example, when the device has WI-FI® capability, its location may be estimated within 30-500 meters (depending on transmission range from a wireless access point). If the device has cellular capability, its location may be estimated using one or more cellular base stations (or towers), yet the accuracy may only be 300-3,000 meters. The location of the device may also be estimated from its Internet Protocol address, but the accuracy may only be 1,000-5,000 meters. So, even if the device has some means of geo-location, the accuracy may be inadequate for effective location-based services. Exemplary embodiments thus provide a surrogate locational determination that relies on the nearby surrogate device 206.

Exemplary embodiments may packetize. The information handling system 100 and the smartphone 208 have one or more of the network interfaces (such as illustrated as reference numeral 180 in FIG. 1) to the communications network 216. The network interface may packetize communications or messages into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Figure 3:
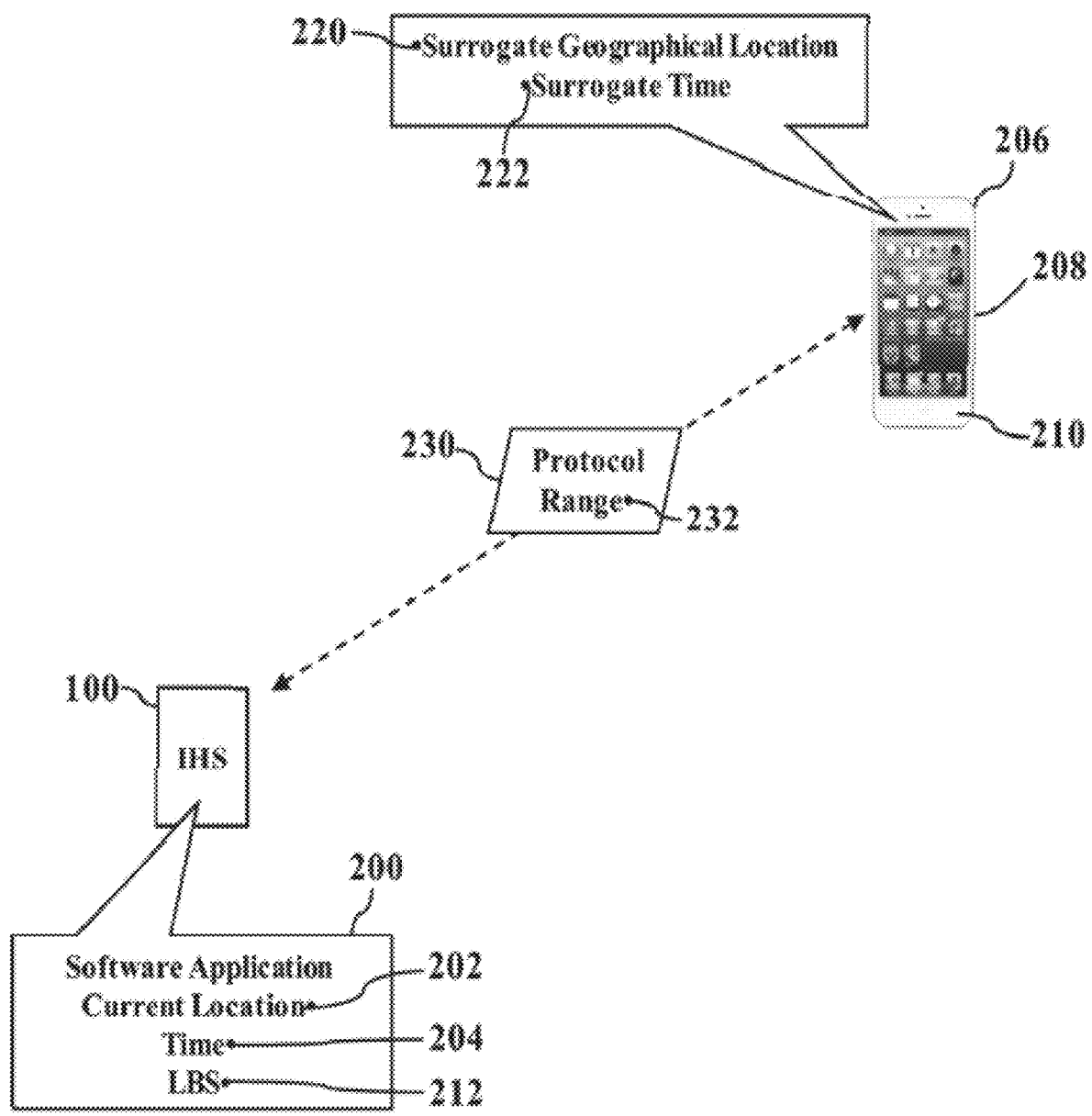
FIGS. 3-5 illustrate proximity-based determinations, according to exemplary embodiments.
Figure 4:
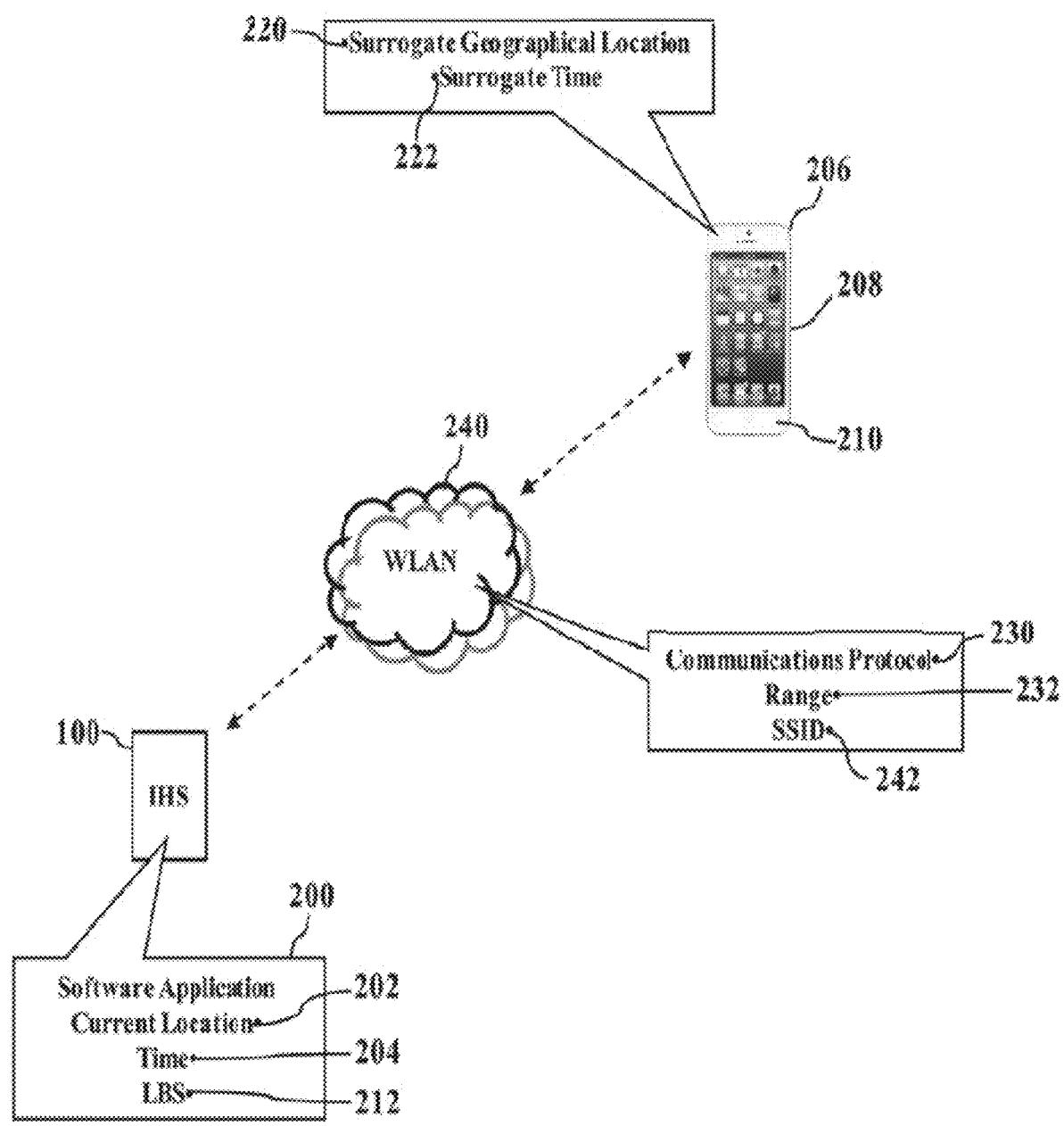
Figure 5:
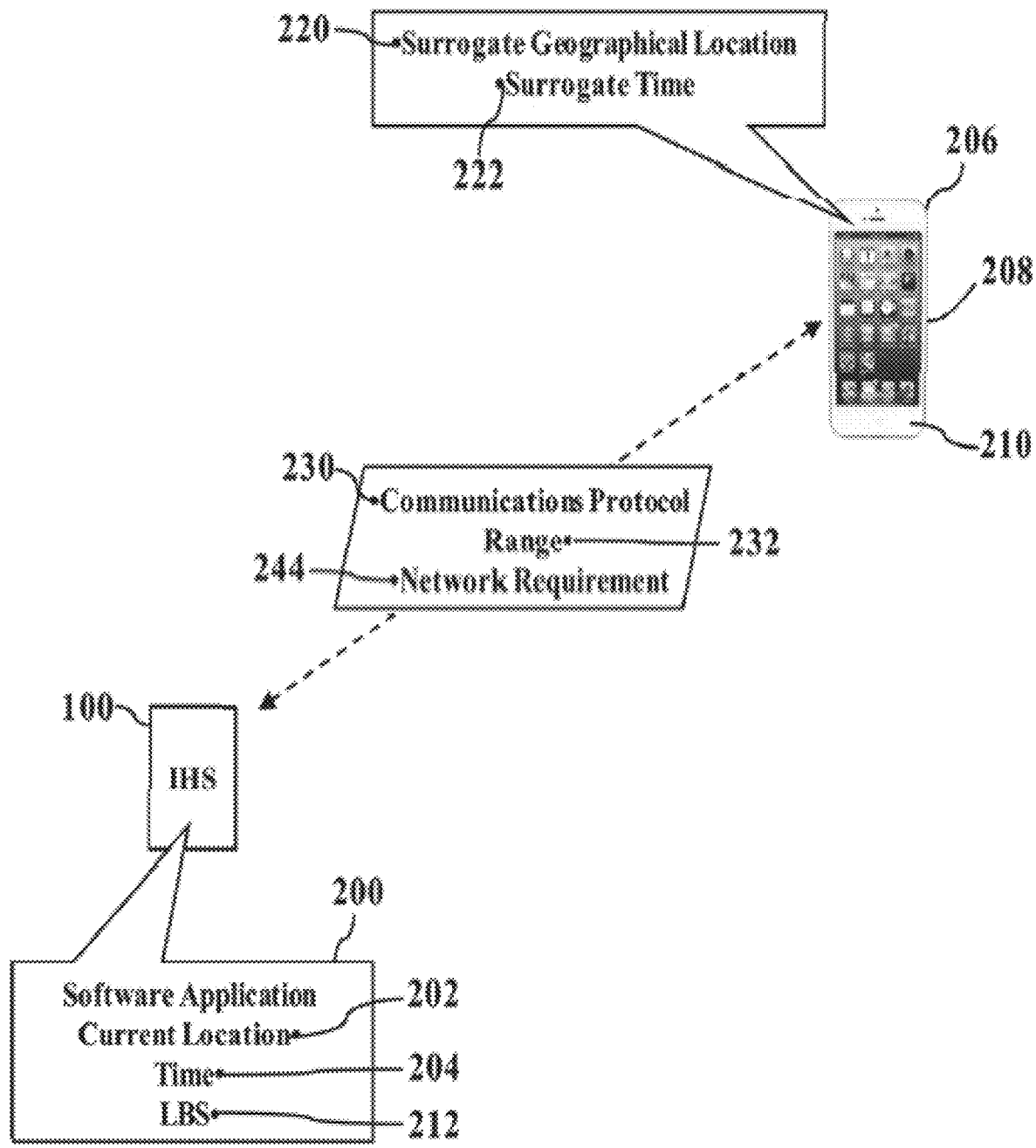

FIGS. 3-5 illustrate proximity-based determinations, according to exemplary embodiments. Here the surrogate device 206 is determined to be proximally located to the information handling system 100. That is, the surrogate geographical location 220 (provided by the smartphone 208) is determined to confidently, and/or accurately, represent the current location 202 associated with the information handling system 100. As the reader may realize, the information handling system 100 and the surrogate device 206 should share approximately the same physical location. If the smartphone 208 is a few miles from the information handling system 100, then the surrogate geographical location 220 (determined by the smartphone's internal GPS receiver 210) inaccurately represents the current location 202 associated with the information handling system 100. Indeed, even a discrepancy of a few hundred yards may be unacceptable (especially for user authentication schemes). Exemplary embodiments, then, may only delegate geo-locational determinations when the smartphone 208 is geographically proximate to the information handling system 100. For example, exemplary embodiments may approve or deny surrogation, based on a communications protocol 230. As FIG. 3 illustrates, the smartphone 208 and the information handling system 100 may establish short-range peer-to-peer communications (such as via BLUETOOTH® or near-field communications protocols). These communications protocols 230 are known to have a short or small wireless transmission range 232 (for example several feet or less). These short wireless transmission ranges 232, in other words, may accurately indicate a shared proximal geographic location. Exemplary embodiments may thus infer or determine that the smartphone 208 and the information handling system 100 share nearly the same, or even identical, geographical location. An output of the smartphone's internal GPS receiver 210, in other words, may accurately represent the current location 202 associated with the information handling system 100. So, whenever wireless communication is established using the communications protocol 230 known to have a short or even acceptable wireless transmission range 232, exemplary embodiments may infer a shared geographic location. Exemplary embodiments, in plain words, may approve or authorize the surrogate geographical location 220, as determined by the surrogate device 206.

Geographic proximity may thus be inferred. If the smartphone 208 is geographically close and/or physically proximate to the information handling system 100, short-range peer-to-peer communications may be established. So, whenever wireless communication is established using the communications protocol 230 known to have a short or even acceptable wireless transmission range 232, exemplary embodiments may infer a short communications path to the smartphone 208. Exemplary embodiments may infer geographic proximity, based on the communications protocol 230.

FIG. 4 illustrates network-based authorization. Here exemplary embodiments may approve or authorize the surrogate geographical location 220, based on a wireless local area network (or "WLAN") 240. Suppose the smartphone 208 and the information handling system 100 establish wireless communications via WI-FI®, which has its own communications protocol 230 (such as any of the IEEE 802 standards). Even though WI-FI® may have a longer or greater wireless transmission range 232, the surrogate geographical location 220 (determined by the smartphone's internal GPS receiver 210) may still be accurate enough as a proxy or substitute for the current location 202 associated with the information handling system 100. So, whenever the smartphone 208 and the information handling system 100 communicate using the same WI-FI® network 216, exemplary embodiments may approve or authorize the surrogate geographical location 220, as determined by the surrogate device 206. As a simple example, if the smartphone 208 and the information handling system 100 communicate using a shared or common service set identifier (or "SSID) 242, then exemplary embodiments may infer that the smartphone 208 and the information handling system 100 communicate using the same WI-FI® network 240. The surrogate geographical location 220 may thus substitute for the current location 202 associated with the information handling system 100. Exemplary embodiments may again infer geographic proximity, based on the communications protocol 230.

FIG. 5 illustrates a network requirement 244. Here the information handling system 100 may authorize surrogate locational determination, perhaps only if the network requirement 244 is satisfied. Suppose the software application 200 requires a very accurate locational determination. If the smartphone 208 and the information handling system 100 establish the short-range communication via BLUETOOTH® or near-field communications protocols 230, then the software application 200 may infer that the surrogate geographical location 220 accurately represents the current location 202 associated with the information handling system 100. The network requirement 244, in other words, implicitly specifies an accuracy of the surrogate geographical location 220 determined by the surrogate smartphone's internal GPS receiver 210. Similarly, if the network requirement 244 permits communications using the same WI-FI® network 240 (such as the shared or common SSID 242, as illustrated with reference to FIG. 4), exemplary embodiments may infer that the surrogate geographical location 220 is adequately accurate. So, if the smartphone 208 and the information handling system 100 establish communication according to the network requirement 244, then the software application 200 may approve surrogate locational determination. If, however, the smartphone 208 and the information handling system 100 cannot establish communication according to the network requirement 244, then the software application 200 may deny surrogate locational determination.

Exemplary embodiments, then, may only delegate locational functions when the smartphone 208 is proximally located to the information handling system 100. For example, exemplary embodiments may approve or deny surrogation, based on the communications protocol 230 and/or network identification (such as the SSID 242). Different software applications and different location-based services may thus have different locational accuracies when approving, or when denying, surrogate locational determinations. Exemplary embodiments may thus outsource or subcontract any locational determination to the surrogate device 206 when the network requirement 244 is satisfied.

FIGS. 6-10 illustrate trusted surrogates, according to exemplary embodiments. Here exemplary embodiments may require a trusted relationship 250 between the information handling system 100 and the surrogate device 206 (again illustrated as the smartphone 208). Even though the smartphone 208 may be geographically proximate to the information handling system 100, exemplary embodiments may require that the surrogate device 206 provide or confirm the security credentials 218. If the surrogate device 206 cannot provide or authenticate using the security credentials 218, then exemplary embodiments may deny surrogate locational determination. That smartphone 208, in other words, may not be trusted to provide the surrogate geographical location 220, regardless of proximity or accuracy.

Figure 6:
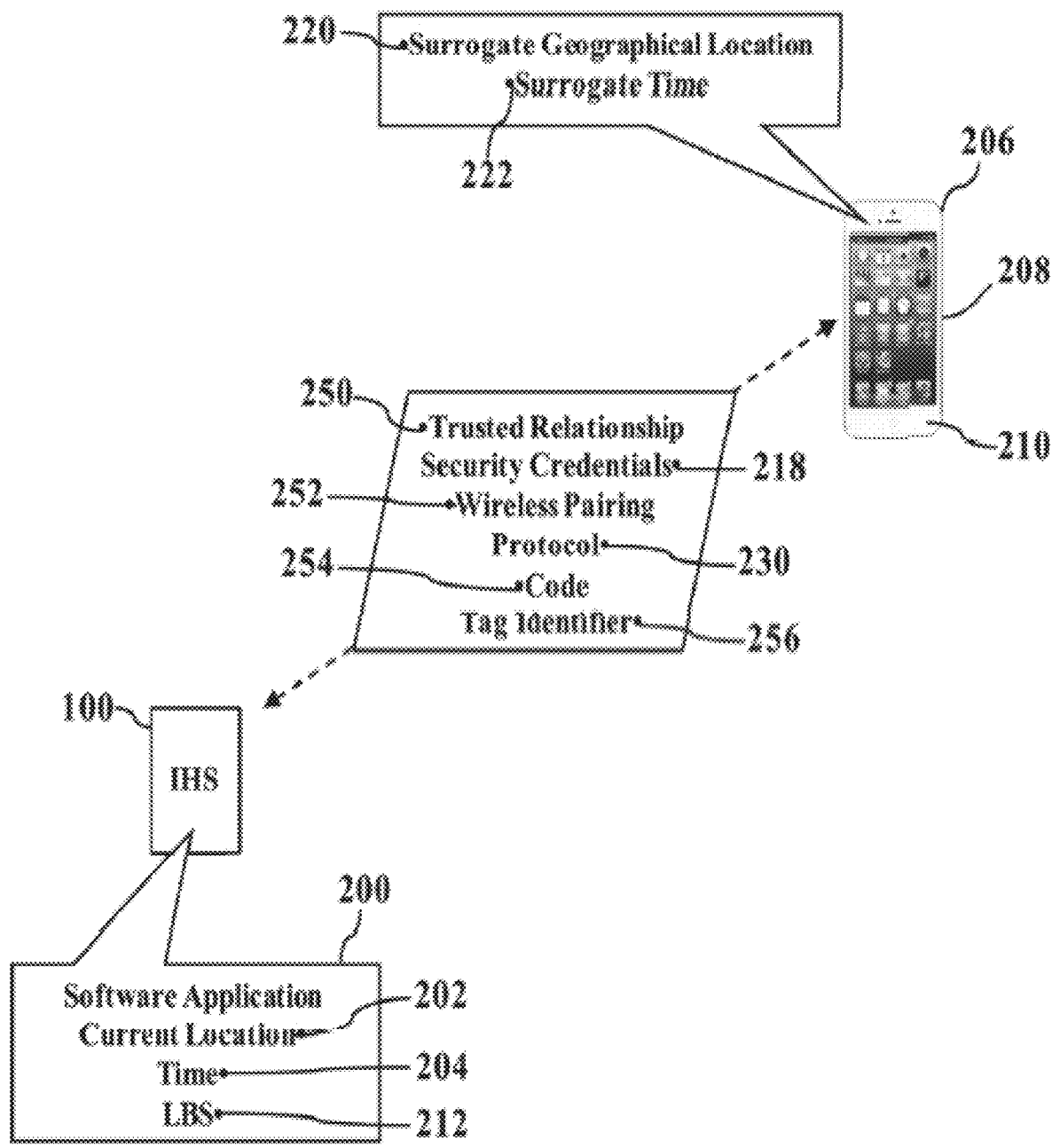
FIGS. 6-10 illustrate trusted surrogates, according to exemplary embodiments.

FIG. 6, for example, illustrates a wireless pairing 252. When the smartphone 208 and the information handling system 100 establish short-range communication (such as via BLUETOOTH® or near-field communications protocols 230), exemplary embodiments may require the security credentials 218. While the security credentials 218 may be as complicated as desired, for simplicity the security credentials 218 are typically pre-provisioned as a predetermined code 254 or tag identifier 256. For example, when the smartphone 208 responds and provides information that matches the required code 254 or tag identifier 256, then exemplary embodiments may trust the smartphone 208 to provide its geographical location 220 as a surrogate location. If, however, the smartphone 208 fails to provide or send the correct code 254 or tag identifier 256, the smartphone 208 may be untrusted to provide the geographical location 220.

Figure 7:
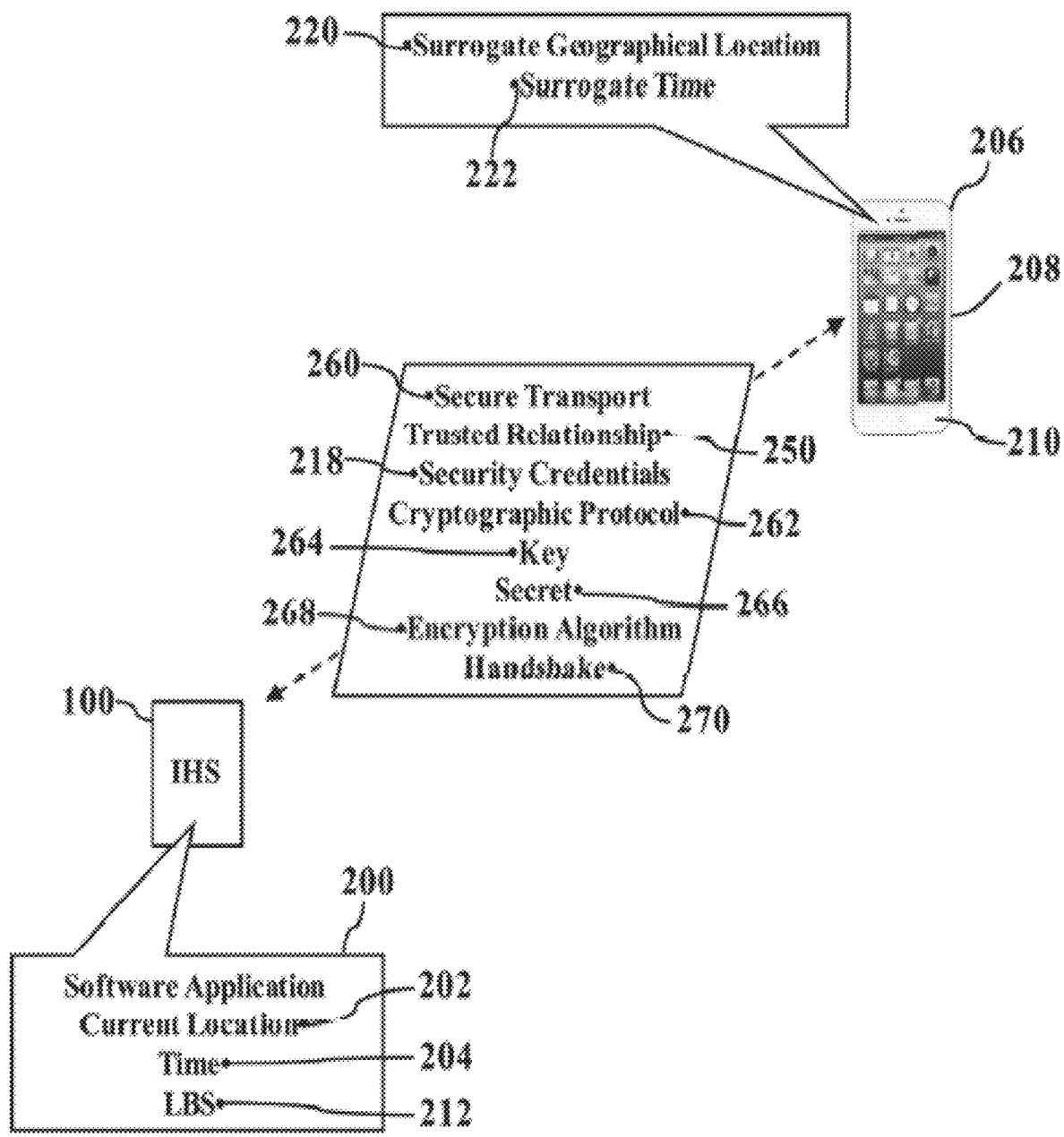

FIG. 7 illustrates a secure transport 260. Here the trusted relationship 250 may be exemplified by the secure transport 260 established between the information handling system 100 and the surrogate device 206 (again illustrated as the smartphone 208). The secure transport 260 may represent a private peer-to-peer communication or secure network communications. The security credentials 218, in other words, may specify any cryptographic protocol 262 for privacy and data integrity. So, when the information handling system 100 and the smartphone 208 communicate, packets of data may be encrypted using one or more keys 264 and/or secrets 266. For example, the information handling system 100 and the smartphone 208 may establish a session and negotiate the keys 264, the secrets 266, and an encryption algorithm 268 during an initial handshake 270. When the smartphone 208 and the information handling system 100 establish short-range communication (perhaps via BLUETOOTH® or near-field communications protocols 230), exemplary embodiments may thus establish the secure transport 260 to further entrust the geographical location 220 provided by the surrogate smartphone 208. The smartphone 208 and the information handling system 100 may have near-field inductive communications readers that establish the secure transport 260.

Figure 8:
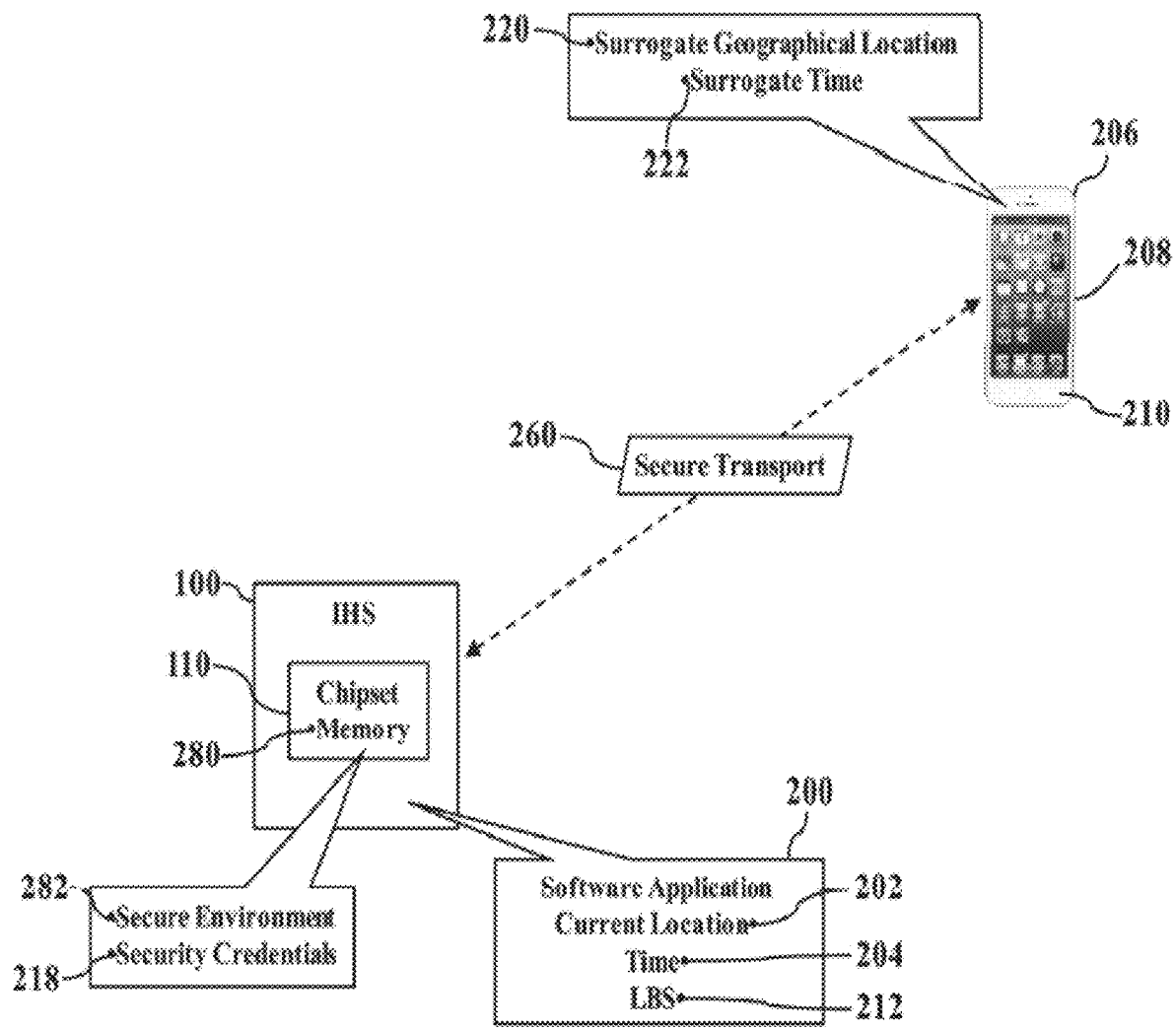
Figure 9:
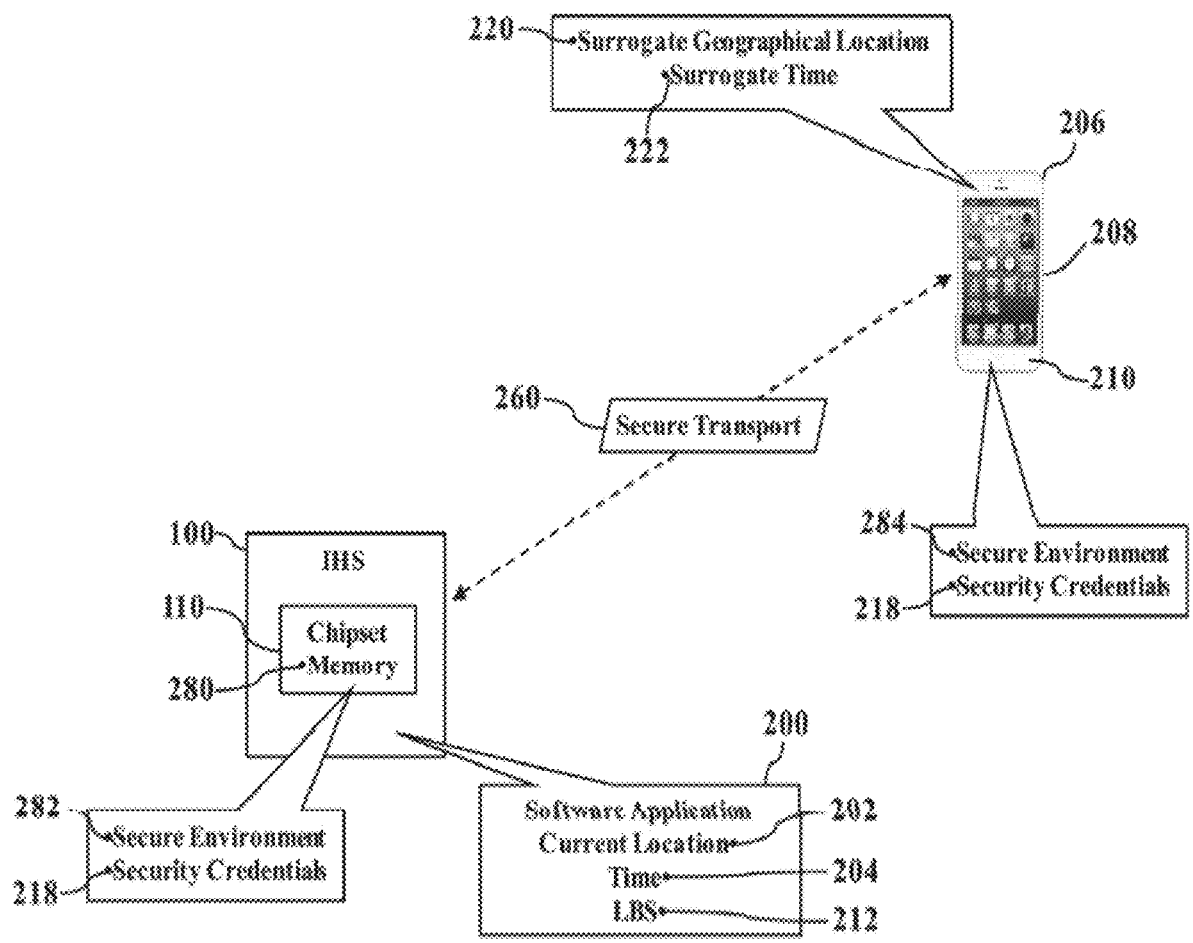

FIGS. 8-9 further illustrate the secure transport 260. Here the secure transport 260 may utilize a hardware-based solution that stores some or all of the security credentials 218 in a system memory 280 of the information handling system 100. That is, here the secure transport 260 isolates the security credentials 218 from an operating system and from the physical hard disk drives(s) (such as the hard disk drive 154 and the optical disk drive 156 illustrated in FIG. 1), which are notoriously insecure. The security credentials 218, for example, may be stored or maintained within a secure environment 282 of the chipset 110 (such as the keys 264, the secrets 266, and the encryption algorithm 268 illustrated in FIG. 7). Indeed, the security credentials 218 may even be encrypted within, or inside, the secure environment 282 of the chipset 110. The security credentials 218 may thus be encrypted and decrypted without exposure outside the chipset 110. The secure transport 260, for example, may conform to or utilize the CONTROLVAULT® security feature provided by Dell, Incorporated. So, as FIG. 9 best illustrates, the surrogate device 206 (again illustrated as the smartphone 208) may also establish its own secure environment 284 within its internal processor or chipset (not shown for simplicity). Both the information handling system 100 and the smartphone 208 may thus use the DELL® CONTROLVAULT® security feature to establish the secure transport 260. The DELL® CONTROLVAULT® security feature thus allows exemplary embodiments to entrust the surrogate geographical location 220 provided by the surrogate smartphone 208.

Figure 10:
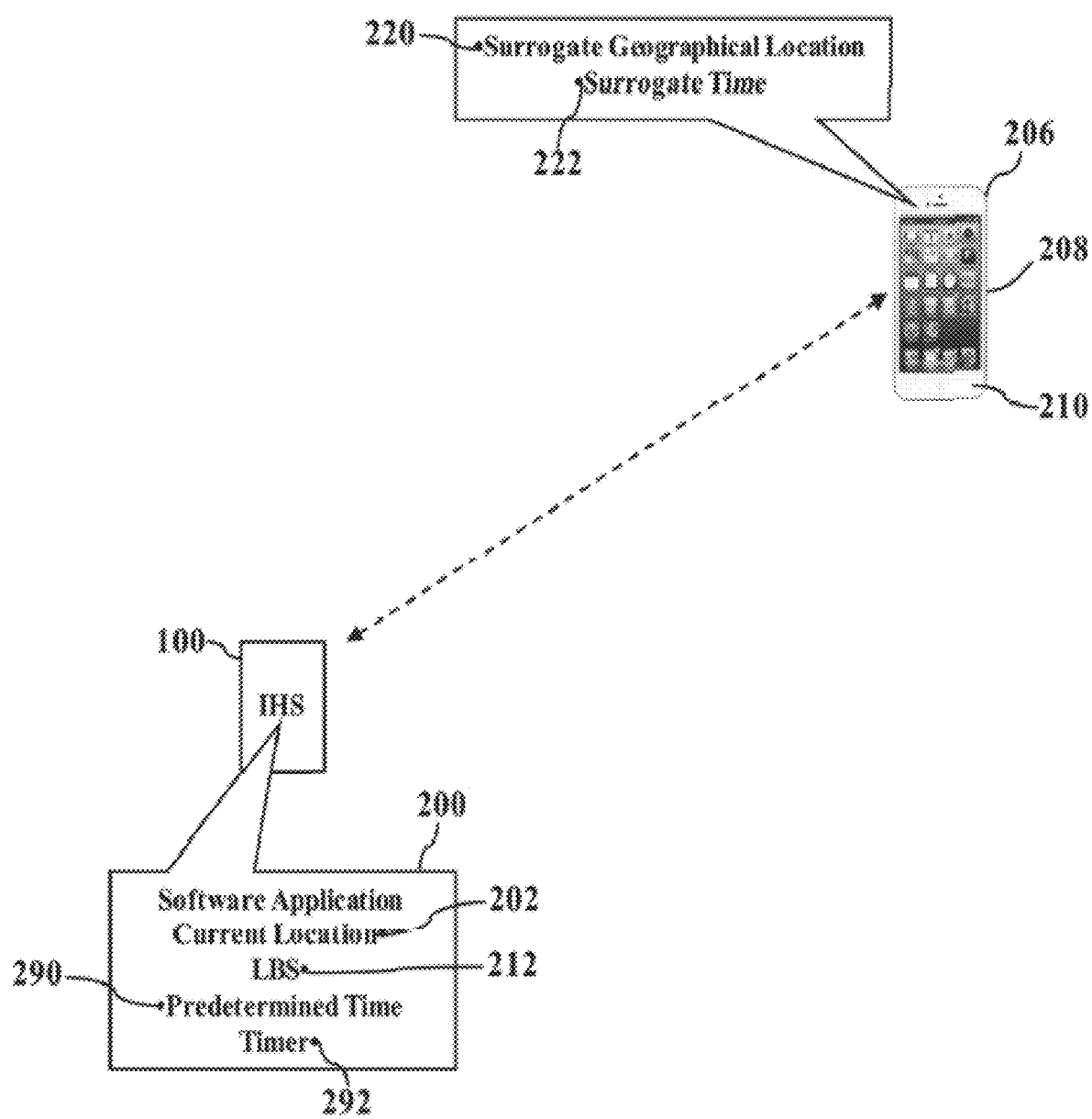

FIG. 10 illustrates a timing requirement. Here the surrogate device 206 (again illustrated as the smartphone 208) may be required to provide its surrogate geographical location 220 within a predetermined time 290. Again, suppose the software application 200 calls for the current location 202 after or post-login to provide the location-based service (LBS) 212. Yet the information handling system 100 lacks an accurate geo-location capability to provide the current location 202. The software application 200 may initialize a timer 292 at an initial value (such as zero) and count or increment to a final value representing the predetermined time 290. If the surrogate geographical location 220 is received prior to expiration at the final value, then exemplary embodiments may entrust the surrogate geographical location 220 provided by the smartphone 208. However, if the timer 292 expires prior to receipt of surrogate geographical location 220, then the software application 200 may have authority to decline the smartphone 208. The expired timer 292, for example, may indicate that the smartphone 208 is not geographically proximate to act as a surrogate for locational determinations. Exemplary embodiments, in other words, may assume that the surrogate geographical location 220 is time-sensitive and must be received within the predetermined time 290.

Figure 11:
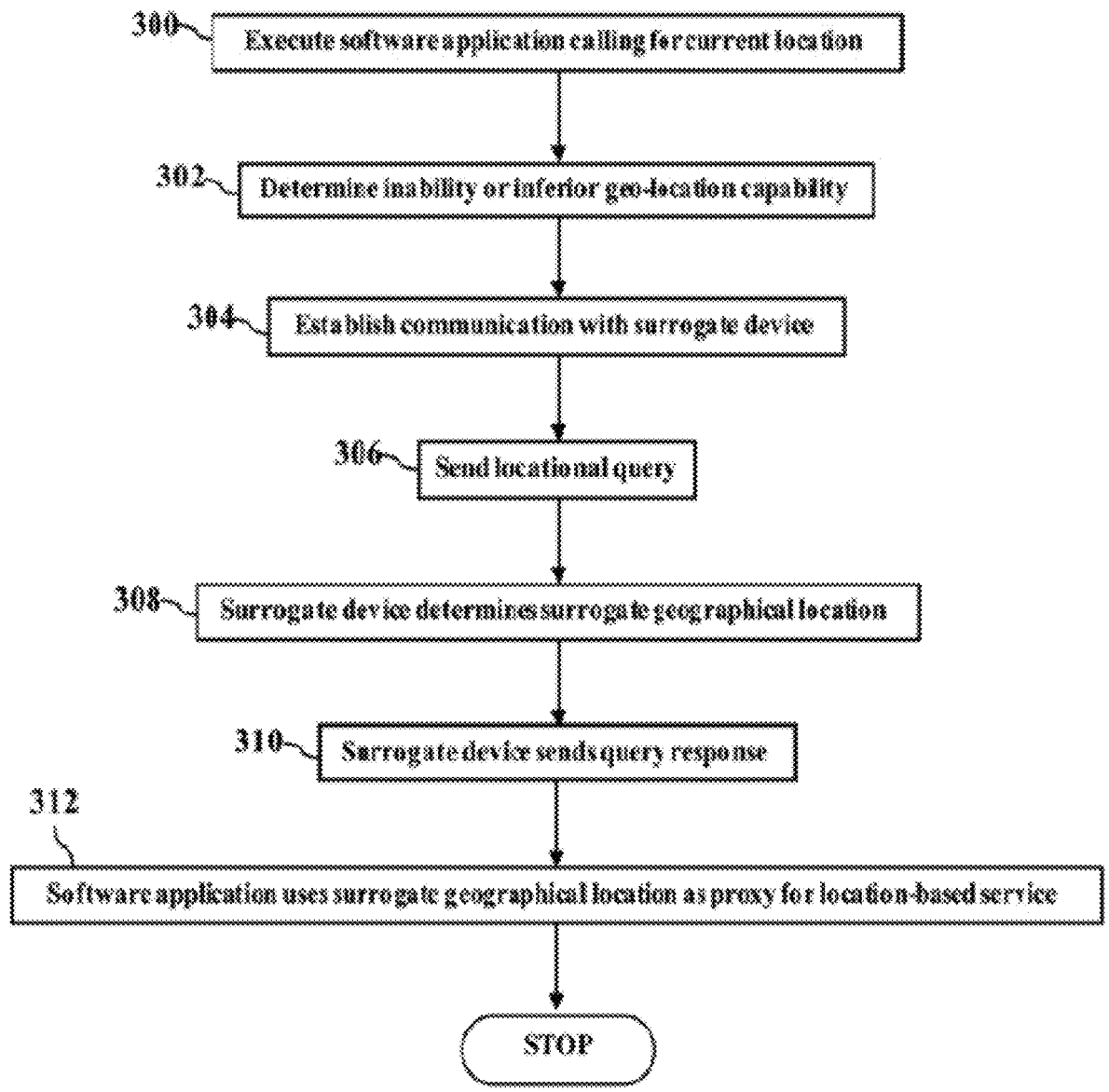
FIG. 11 is a simplified flowchart illustrating a method for surrogate locational determinations, according to exemplary embodiments.

FIG. 11 is a simplified flowchart illustrating a method for surrogate locational determinations, according to exemplary embodiments. Here a device (such as the information handling system 100 illustrated in FIGS. 1-10) executes the software application 200 that calls for the current location 202 after or post-login to provide the location-based service 212 (Block 300). The device determines an inability to geo-locate or an inferior geo-location system (Block 302). The device establishes communication with the surrogate device 206 (Block 304) and sends the locational query 214 (Block 306). The surrogate device 206 determines its surrogate geographical location 220 (Block 308) and sends the query response 224 (Block 310). When the device receives the query response 224, the software application 200 uses the surrogate geographical location 220 as a proxy for the location-based service 212 (Block 312).

Figure 12:
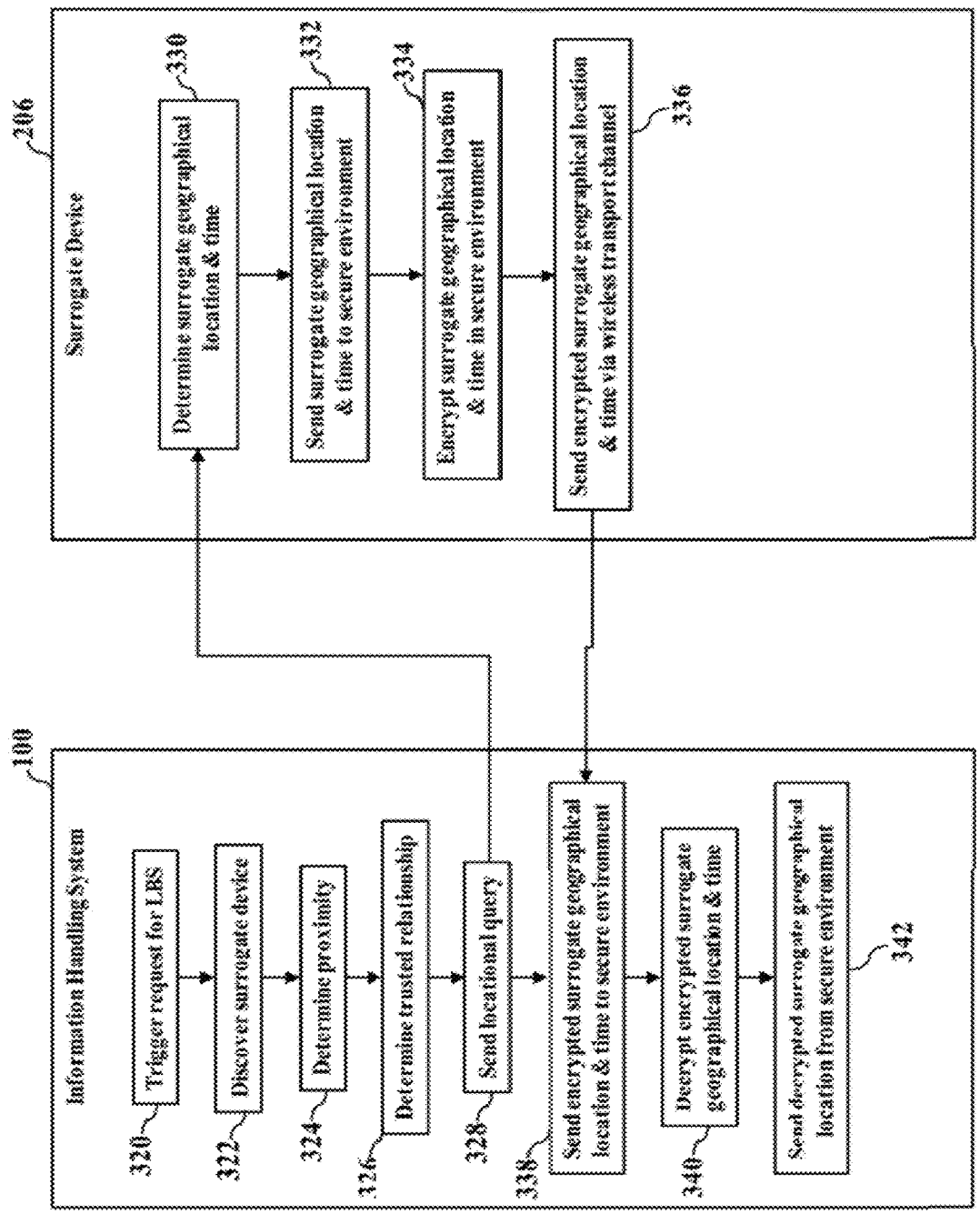
FIGS. 12-14 are more detailed flowcharts illustrating the method for surrogate locational determinations, according to exemplary embodiments.

FIG. 12 is a more detailed flowchart illustrating the method for surrogate locational determinations, according to exemplary embodiments. A request for the location-based service (LBS) 212 is triggered (perhaps by the software application 200 illustrated in FIGS. 2-10 or at service launch) (Block 320). The device (such as the information handling system 100 illustrated in FIGS. 1-10) discovers the surrogate device 206 (Block 322), determines proximity (Block 324), and determines the trusted relationship 250 (Block 326). The locational query 214 is sent (Block 328), and the surrogate device 206 determines its surrogate geographical location 220 and surrogate time 224 (Block 330). The surrogate device 206 sends the surrogate geographical location 220 and the surrogate time 224 to its hardware secure environment 284 (Block 332) for encryption (Block 334). The encrypted packets of data containing the surrogate geographical location 220 and surrogate time 224 are then sent to the information handling system 100 via the secure transport 260 (Block 336). The secure transport 260, as above explained, may utilize the wireless pairing 252, the codes 254 and tag identifiers 256, the key 264 and secret 266, the DELL® CONTROLVAULT® security feature, and/or the communications protocol 230 (BLUETOOTH®, near-field, WI-FI®, and/or other standard). When the information handling system 100 receives the encrypted packets of data (containing the surrogate geographical location 220 and surrogate time 224), the encrypted packets of data are sent to the secure environment 282 (Block 338). The encrypted packets of data are decrypted within the secure environment 282 of the information handling system 100 (Block 340), thus revealing the surrogate geographical location 220 and surrogate time 224. The surrogate geographical location 220 and surrogate time 224 are then sent out of the secure environment 282 and to the software application 200 for the location-based service (LBS) (Block 342).

Figure 13:
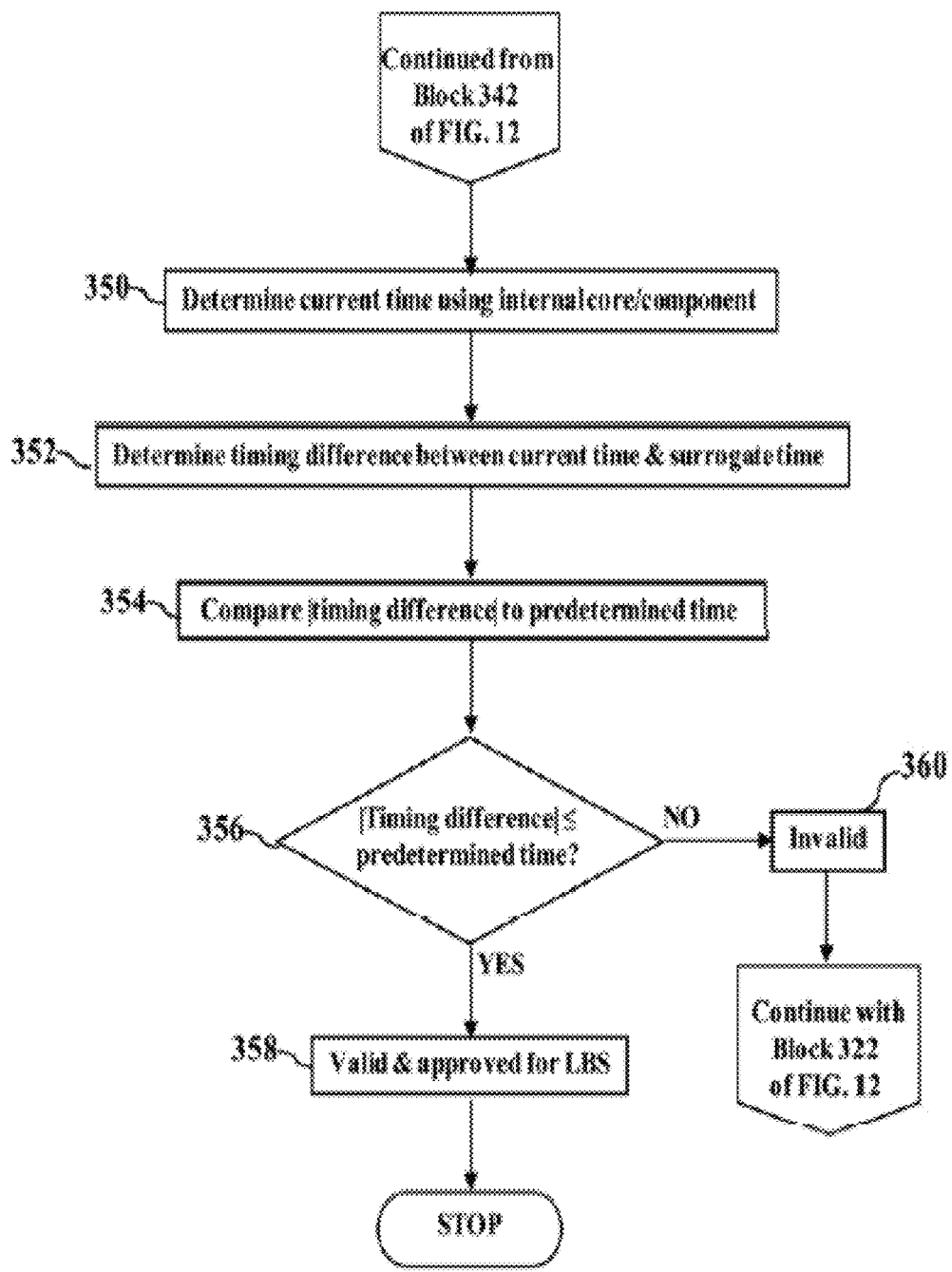

FIG. 13 shows another method for surrogate locational determinations, according to exemplary embodiments. Here the algorithm may be tailored for when the information handling system 100 has no means or componentry for geo-location. Some of the informational blocks are similar or identical to FIG. 12, so these details need not be again explained. For example, once the surrogate geographical location 220 and the surrogate time 224 are decrypted (see Block 342 of FIG. 12), the information handling system 100 may obtain or retrieve a current time determined by an internal timing core or component (Block 350). The current time may be determined or estimated using a system clock. An absolute value of a timing difference is determined (Block 352) between the current time (estimated by an internal system clock) and the surrogate time 224 decrypted from the surrogate device 206. The absolute value of the timing difference may then be compared to the predetermined time 290 (Block 354). If the absolute value of the timing difference is less than or equal to the predetermined time 290 (Block 356), then the surrogate time 224 is validated and the surrogate geographical location 220 is approved for location-based services (Block 358). However, if the absolute value of the timing difference exceeds the predetermined time 290 (Block 356), then the surrogate time 224 may be invalid (Block 360). The surrogate geographical location 220, in other words, may not be approved for location-based services. The algorithm may then return to Block 322 of FIG. 12, wherein a different surrogate device is discovered and evaluated.

Figure 14:
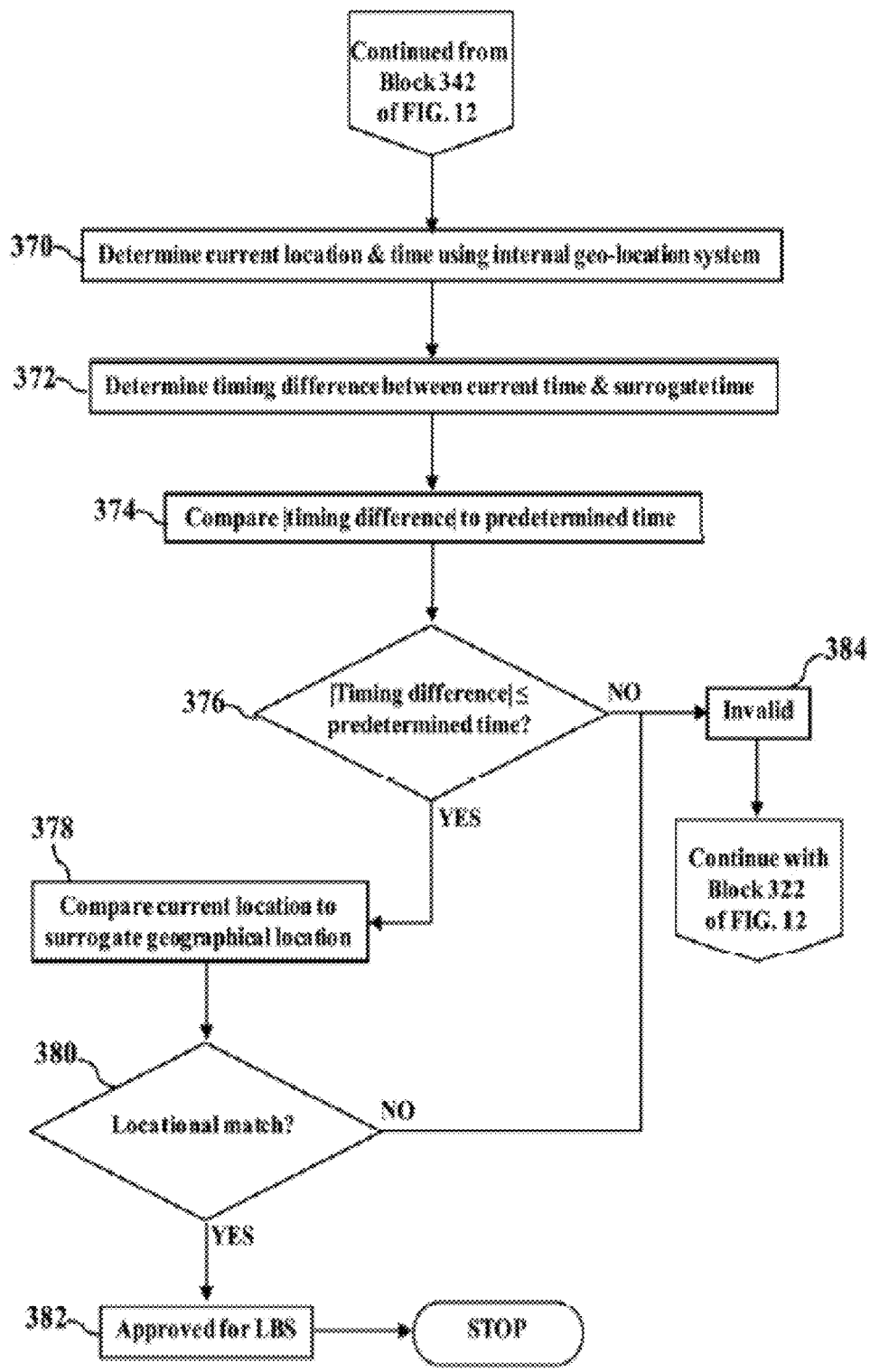

FIG. 14 is yet another flowchart illustrating the method for surrogate locational determinations, according to exemplary embodiments. Here the algorithm may be tailored for when the information handling system 100 has a poor, inferior, and/or inaccurate means for geo-location. Again, as this disclosure above explained, some geo-location systems and techniques are too inaccurate for reliable location-based services. FIG. 14 thus illustrates steps or actions for when geo-location is available but inaccurate. Some of the informational blocks are similar or identical to FIG. 12, so these details need not be again explained. For example, once the surrogate geographical location 220 and the surrogate time 224 are received and decrypted (see Block 342 of FIG. 12), the information handling system 100 may obtain or retrieve the current location 202 and the current time from its internal geo-location system (Block 370). As this disclosure above explained, geo-location using a WI-FI® access point, cellular base stations, Internet Protocol addresses may yield an estimate of the the current location 202 and the current time. The absolute value of the timing difference is determined (Block 372) between the current time (determined by the internal geo-location system) and the surrogate time 224 decrypted from the surrogate device 206. The absolute value of the timing difference may then be compared to the predetermined time 290 (Block 374). If the absolute value of the timing difference is less than or equal to the predetermined time 290 (Block 376), then the surrogate time 224 is validated. In other words, the current time (determined by the internal geo-location system) and the surrogate time 224 (decrypted from the surrogate device 206) may need to be approximately the same (for example within the predetermined time 290) in order to validate. When the predetermined time 290 is satisfied (Block 376), the the current location 202 is compared to the surrogate geographical location 220 (Block 378). If the current location 202 approximately matches the surrogate geographical location 220 (perhaps within some threshold radius or distance) (Block 380), then the surrogate geographical location 220 may be approved for location-based services (Block 382). The surrogate geographical location 220, for example, may be used as an input for data and/or device access control.

Invalidation may also occur. First, if the absolute value of the timing difference exceeds the predetermined time 290 (Block 376), then the surrogate time 224 may be invalid (Block 384) and a different surrogate device is discovered and evaluated (such as Block 322 of FIG. 12). Likewise, when the current location 202 fails to approximately match the surrogate geographical location 220 (Block 380), then the surrogate geographical location 220 is considered invalid (Block 384) and another surrogate device is discovered and evaluated (such as Block 322 of FIG. 12).

Exemplary embodiments may thus include different usage scenarios. For example, when the information handling system 100 completely lacks any capability or functionality for geo-location, the information handling system 100 may obtain the surrogate geographical location 220 and the surrogate time 225 from the surrogate device 206. Exemplary embodiments may require that the surrogate device 206 be pre-provisioned (for example the trusted relationship 250) and geographically proximate. The surrogate time 225 may even be required to be within the predetermined time 290 (such as a block or measure of time). Exemplary embodiments may thus approve access to secured data through encryption key availability.

Another usage scenario may be established for poor or inferior geo-location capability. Here the information handling system 100 estimates its current location 202 and the current time using its internal geo-location system (estimated, for example, using using a WI-FI® access point, cellular base stations, Internet Protocol addresses, or any indoor positioning system). If the surrogate geographical location 220 and the surrogate time 224 (provided by the surrogate device 206) favorably compares to the current location 202 and the current time (determined from the internal geo-location system), then surrogate locational determination may be approved.

Exemplary embodiments thus improve authentication schemes. Location may be used as one of a multi-pronged approach to secure authentication. However, location-based authentication schemes may be inapplicable to devices that lack reliable and/or accurate geo-location capabilities. Exemplary embodiments, though, repurpose the secure transport 260 to provide location-based authentication using communications architectures for carrying high value data. Exemplary embodiments may even be scaled in concept for multiple operating systems and multiple device power states. Nested time packets/window ensure data freshness and protection from replay attacks. Pre-provisioned devices, having the pre-exchanged secret 266 and/or the symmetric key 264 are trusted to supply the surrogate geographical location 220 and the surrogate time 224. Locally-stored policies may determine geo-location data confidence and seeks higher confidence data from secondary devices if higher confidence mechanisms are available. Moreover, exemplary embodiments may even allow or disallow encryption keys for data access. Location-based services may thus provide trusted and secure authentication login.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (such as random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components.

Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method, comprising:
    determining, by a device, a location-based service desiring a current location associated with the device;
    determining, by the device, that a global positioning system receiver is lacking to provide the current location desired by the location-based service;
    determining a common service set identifier that is shared with a surrogate device;
    in response to the common service set identifier that is shared with the surrogate device, determining, by the device, that the surrogate device is locationally accurate;
    in response to the surrogate device being locationally accurate, sending, by the device, a query to the surrogate device via the common service set identifier requesting a security credential;
    receiving a reply to the query from the surrogate device;
    in response to the reply from the surrogate device specifying the security credential, retrieving a surrogate geographic location determined by the global positioning system receiver operating in the surrogate device; and
    using, by the device, the surrogate geographic location retrieved from the surrogate device as the current location desired by the location-based service.

2. The method of claim 1, further comprising approving locational surrogation in response to the common service set identifier.

3. The method of claim 1, further comprising inferring that the surrogate device is the locationally accurate based on the common service set identifier.

4. The method of claim 1, further comprising retrieving a surrogate time determined by the global positioning system receiver operating in the surrogate device.

5. The method of claim 1, further comprising determining a trusted relationship between the device and the surrogate device.

6. The method of claim 5, further comprising establishing a secure environment in a system memory of a chipset, the secure environment storing security credentials that determine the trusted relationship.

7. The method of claim 1, further comprising establishing a secure transport between the device and the surrogate device.

8. An information handling system, comprising:
    a processor; and
    a memory device accessible to the processor and storing instructions that when executed by the processor perform operations, the operations including:
        executing a software application that provides a location-based service, the location-based service desiring a current location associated with the information handling system;
        determining that the information handling system lacks a global positioning system receiver that provides the current location desired by the location-based service;
        determining a common service set identifier that is shared between the information handling system and a surrogate device;
        in response to the common service set identifier that is shared with the surrogate device, determining that the surrogate device is locationally accurate to the information handling system;
        in response to the surrogate device being locationally accurate, determining an encryption key that is associated with the surrogate device;
        generating an encrypted query using the encryption key that is associated with the surrogate device;
        sending the encrypted query to the surrogate device requesting a surrogate geographic location determined by a global positioning system receiver operating in the surrogate device; and
        using the surrogate geographic location retrieved from the surrogate device as the current location desired by the location-based service.

9. The system of claim 8, wherein the operations further comprise approving locational surrogation in response to the common service set identifier.

10. The system of claim 8, wherein the operations further comprise denying locational surrogation in response to the surrogate device failing to share the common service set identifier.

11. The system of claim 8, wherein the operations further comprise retrieving a surrogate time determined by the global positioning system receiver operating in the surrogate device.

12. The system of claim 8, wherein the operations further comprise determining a trusted relationship between the information handling system and the surrogate device.

13. The system of claim 8, wherein the operations further comprise establishing a secure environment in a system memory of a chipset, the secure environment storing security credentials that determine the trusted relationship.

14. The system of claim 8, wherein the operations further comprise establishing a secure transport between the information handling system and the surrogate device.

15. A memory device storing instructions that when executed by a processor perform operations, the operations comprising:

executing a software application that provides a location-based service, the location-based service desiring a current location associated with an information handling system;

determining that the information handling system lacks a global positioning system receiver that provides the current location desired by the location-based service;

determining a common service set identifier that is shared between the information handling system and a surrogate device;

in response to the common service set identifier that is shared with the surrogate device, determining that the surrogate device is locationally accurate to the information handling system;

in response to the surrogate device being locationally accurate, retrieving a security credential from a chipset that is associated with the surrogate device;

generating an encrypted query using the security credential retrieved from the chipset;

sending the encrypted query to the surrogate device requesting a surrogate geographic location determined by a global positioning system receiver operating in the surrogate device; and using the surrogate geographic location retrieved from the surrogate device as the current location desired by the location-based service.

16. The memory device of claim 15, wherein the operations further comprise approving locational surrogation in response to the common service set identifier.

17. The memory device of claim 15, wherein the operations further comprise denying locational surrogation in response to the surrogate device failing to share the common service set identifier.

18. The memory device of claim 15, wherein the operations further comprise retrieving a surrogate time determined by the global positioning system receiver operating in the surrogate device.

19. The memory device of claim 15, wherein the operations further comprise determining a trusted relationship between the information handling system and the surrogate device.

20. The memory device of claim 15, wherein the operations further comprise establishing a secure environment in a system memory of a chipset, the secure environment storing security credentials that determine the trusted relationship.

* * * * *